(12) United States Patent
Masuko

(10) Patent No.: US 9,904,711 B2
(45) Date of Patent: Feb. 27, 2018

(54) INFORMATION PROVISION DEVICE, INFORMATION PROVISION METHOD, AND INFORMATION PROVISION PROGRAM

(71) Applicant: Rakuten, Inc., Tokyo (JP)

(72) Inventor: Soh Masuko, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 305 days.

(21) Appl. No.: 14/651,727

(22) PCT Filed: Jun. 28, 2013

(86) PCT No.: PCT/JP2013/067868
§ 371 (c)(1),
(2) Date: Jun. 12, 2015

(87) PCT Pub. No.: WO2014/207912
PCT Pub. Date: Dec. 31, 2014

(65) Prior Publication Data
US 2015/0347418 A1 Dec. 3, 2015

(51) Int. Cl.
*G06F 17/30* (2006.01)
*G06Q 30/02* (2012.01)
*G06Q 50/14* (2012.01)

(52) U.S. Cl.
CPC .... *G06F 17/3053* (2013.01); *G06F 17/30554* (2013.01); *G06Q 30/02* (2013.01); *G06Q 50/14* (2013.01)

(58) Field of Classification Search
CPC ........... G06F 17/3035; G06F 17/30554; G06F 17/30864; G06F 17/30876;
(Continued)

(56) References Cited

U.S. PATENT DOCUMENTS

| | | | | |
|---|---|---|---|---|
| 2004/0030994 A1* | 2/2004 | Hui | ................... | G06F 17/30017 715/234 |
| 2005/0190611 A1* | 9/2005 | Rushton | ............ | G11B 11/10595 365/189.09 |

(Continued)

FOREIGN PATENT DOCUMENTS

JP 2004-177999 A 6/2004

OTHER PUBLICATIONS

International Preliminary Report on Patentability dated Jan. 7, 2016 from the International Bureau in counterpart application No. PCT/JP2013/067868.

*Primary Examiner* — Anh Ly
(74) *Attorney, Agent, or Firm* — Sughrue Mion, PLLC

(57) ABSTRACT

An information provision device according to one embodiment includes an acquisition unit, a counting unit, and a presentation unit. The acquisition unit refers to data containing a location of a facility, a comment posted by a user of the facility, and a date of use of the facility by the user in association with one another, and acquires a set of an area where the facility is located, a keyword extracted from the comment, and a period corresponding to the date of use. The counting unit counts the number of sets in each time during a specified period for each pair of the area and the keyword and thereby obtains a distribution of the number. The presentation unit outputs information about the pair having a burst time where the number is larger than in other times by a specified criterion or more, in association with the burst time.

12 Claims, 9 Drawing Sheets

(58) Field of Classification Search
CPC ......... G06F 17/30424; G06F 17/30657; G06F 17/30; G06Q 10/02; G06Q 30/02; G06Q 50/14
See application file for complete search history.

(56) References Cited

U.S. PATENT DOCUMENTS

| | | | | |
|---|---|---|---|---|
| 2007/0011181 A1* | 1/2007 | Daskalovic | ....... | G06F 17/30333 707/E17.014 |
| 2008/0222557 A1* | 9/2008 | Abe | ...................... | G06F 3/0482 715/784 |
| 2009/0115617 A1* | 5/2009 | Sano | ................. | G06F 17/30241 340/573.1 |
| 2009/0116402 A1* | 5/2009 | Yamasaki | ............. | H04L 43/024 370/253 |
| 2009/0205031 A1* | 8/2009 | Sato | ........................ | A63F 13/12 726/7 |
| 2010/0185984 A1* | 7/2010 | Wright | .................. | G06T 11/206 715/833 |
| 2011/0066625 A1* | 3/2011 | Fukui | ................. | G06F 17/3087 707/748 |
| 2011/0145671 A1* | 6/2011 | Moon | .................... | H04L 1/0048 714/748 |
| 2012/0054054 A1* | 3/2012 | Kameyama | ........ | G01C 21/3608 705/26.1 |
| 2012/0099137 A1* | 4/2012 | Kurose | ................. | G06F 3/1221 358/1.14 |
| 2012/0173565 A1* | 7/2012 | Jacobs | ............. | G06F 17/30873 707/769 |
| 2012/0227004 A1* | 9/2012 | Madireddi | ............. | G06Q 10/06 715/771 |
| 2013/0144891 A1* | 6/2013 | Nagasaka | ......... | G06F 17/30634 707/749 |
| 2014/0136918 A1* | 5/2014 | Katagiri | ............ | G11B 20/1833 714/755 |
| 2014/0136919 A1* | 5/2014 | Katagiri | ............ | H03M 13/2957 714/755 |
| 2014/0325331 A1* | 10/2014 | Madireddi | ............ | G06F 17/243 715/224 |
| 2015/0169712 A1* | 6/2015 | Bhide | ............... | G06F 17/30563 707/602 |
| 2016/0005396 A1* | 1/2016 | Morimoto | .......... | G06Q 30/0281 704/249 |

* cited by examiner

PAIR {AREA A, KEYWORD Ka}

| MONTH | 1 | 2 | 3 | 4 | 5 | 6 | 7 | 8 | 9 | 10 | 11 | 12 |
|---|---|---|---|---|---|---|---|---|---|---|---|---|
| NUMBER OF SETS | 45 | 52 | 60 | 48 | 58 | 55 | 48 | 50 | 55 | 60 | 54 | 47 |

PAIR {AREA A, KEYWORD Kb}

| MONTH | 1 | 2 | 3 | 4 | 5 | 6 | 7 | 8 | 9 | 10 | 11 | 12 |
|---|---|---|---|---|---|---|---|---|---|---|---|---|
| NUMBER OF SETS | 3 | 2 | 5 | 10 | 15 | 5 | 150 | 180 | 140 | 50 | 10 | 2 |

INFORMATION PROVISION DEVICE, INFORMATION PROVISION METHOD, AND INFORMATION PROVISION PROGRAM

CROSS REFERENCE TO RELATED APPLICATIONS

This application is a National Stage of International Application No. PCT/JP2013/067868, filed Jun. 28, 2013, the contents of which are incorporated herein by reference in its entirety.

TECHNICAL FIELD

One aspect of the present invention relates to a device, a method and a program for providing information based on reviews posted by users.

BACKGROUND ART

Frameworks for presenting a plan to those who have not decided a plan for action (for example, a travel plan) or those who do not have any particular tastes are known. For example, an itinerary preparation system that presents recommended itineraries created by a local staff member, a feature plan selected by a general manager among recommended itineraries and the like is disclosed in the following Patent Literature 1.

CITATION LIST

Patent Literature

PTL 1: JP 2004-177999 A

SUMMARY OF INVENTION

Technical Problem

However, in the itinerary preparation system disclosed in Patent Literature 1, a plan is likely to be dependent on the intention of a selector, and there is a possibility that it does not reflect the opinion of the masses, and as a result, a presented plan can be somewhat biased. The bias may be smaller if a user decides a plan by taking the comments posted on the Internet into consideration; however, it takes time and effort to check the comments on the Internet.

In view of the above, it is desirable to provide information to help deciding a plan for action easily with less bias.

Solution to Problem

An information provision device according to one aspect of the present invention includes an acquisition unit configured to, by referring to a storage unit storing data containing a location of a facility, a comment posted by a user of the facility, and a date of use of the facility by the user in association with one another, acquire a set of an area where the facility is located, a keyword extracted from the comment, and a period corresponding to the date of use, a counting unit configured to count the number of sets in each time during a specified period for each pair of the area and the keyword and thereby obtain a distribution of the number, and a presentation unit configured to output information about the pair having a burst time where the number is larger than in other times by a specified criterion or more, in association with the burst time.

An information provision method according to one aspect of the present invention is an information provision method performed by an information provision device, the method including an acquisition step of, by referring to a storage unit storing data containing a location of a facility, a comment posted by a user of the facility, and a date of use of the facility by the user in association with one another, acquiring a set of an area where the facility is located, a keyword extracted from the comment, and a period corresponding to the date of use, a counting step of counting the number of sets in each time during a specified period for each pair of the area and the keyword and thereby obtaining a distribution of the number, and a presentation step of outputting information about the pair having a burst time where the number is larger than in other times by a specified criterion or more, in association with the burst time.

An information provision program according to one aspect of the present invention causes a computer to implement an acquisition unit configured to, by referring to a storage unit storing data containing a location of a facility, a comment posted by a user of the facility, and a date of use of the facility by the user in association with one another, acquire a set of an area where the facility is located, a keyword extracted from the comment, and a period corresponding to the date of use, a counting unit configured to count the number of sets in each time during a specified period for each pair of the area and the keyword and thereby obtain a distribution of the number, and a presentation unit configured to output information about the pair having a burst time where the number is larger than in other times by a specified criterion or more, in association with the burst time.

According to the above aspects, data containing areas where facilities are located, keywords extracted from posted comments, and times when facilities are used is summarized, and a pair of an area and a keyword where there is a time (burst time) when the number of sets is outstandingly larger than in the other times is presented. The presented keyword indicates the event that attracts attention in a specific time in a specific place. In this manner, by presenting when, where and what event will take place based on the posted comments with less bias, it is possible to provide a user with information to help deciding a plan for action easily with less bias.

In the information provision device according to another aspect, when the number of sets in one time is larger than statistics of the number of sets in a plurality of other times by the specified criterion or more, the presentation unit may determine that the one time exists as the burst time.

In the information provision device according to another aspect, when there is the area where the number of sets is a specified value or less, the acquisition unit may merge the area and an adjacent area into one area.

In the information provision device according to another aspect, the presentation unit may output information about the pair by a map indicating an area of the pair having the burst time, the keyword displayed corresponding to the area, and a user interface for changing the time.

In the information provision device according to another aspect, the keyword may be displayed with a specified emphasis in the burst time, and displayed with a less emphasis than the specified emphasis in times adjacent to the burst time.

In the information provision device according to another aspect, when displaying same keywords in the same burst time in a plurality of adjacent areas, one of the same keywords may be displayed corresponding to the plurality of areas.

In the information provision device according to another aspect, when the keyword is selected, information of facilities located in the area corresponding to the keyword may be displayed.

In the information provision device according to another aspect, each area may be set to include at least a specified number of facilities.

Advantageous Effects of Invention

According to one aspect of the present invention, it is possible to provide information to help deciding a plan for action easily with less bias.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

The functions and configuration of an information provision system 1 according to an embodiment are described hereinafter with reference to FIGS. 1 to 7. The information provision system 1 is a computer system that presents when, where and what event will take place to a user in order to give the user the motivation for action. Note that examples of "action" in this specification include travel, excursions and the like, though the variety of the action is not particularly limited. Further, examples of "event" in this specification include occasions, dinner/lunch, tourist attractions, natural phenomena and the like, though the variety of the event is also not particularly limited.

Figure 1:
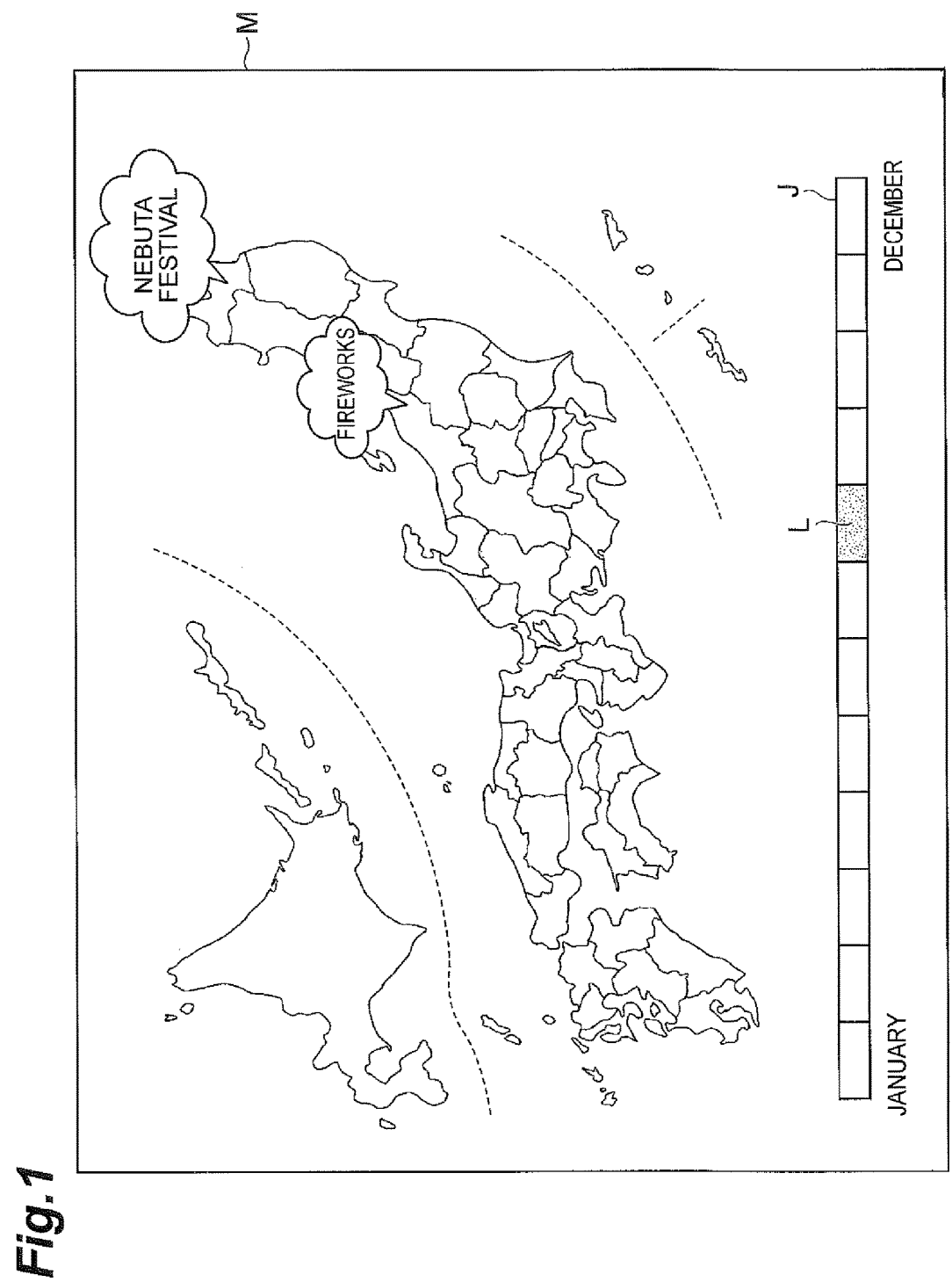
FIG. 1 is a view showing an example of a screen provided by an information provision system according to an embodiment.

FIG. 1 shows an example of a screen that is provided from the information provision system 1 to a user. The screen M includes a map of Japan and a time axis J, and events that take place in the time that is indicated by a slider L on the time axis J are shown by speech balloons. The position where a speech balloon is displayed indicates the place where the event takes place. The example of FIG. 1 shows that, in August, Nebuta Festival is held in Aomori Prefecture, and a fireworks display is held in Niigata Prefecture. The information in the screen M is generated based on comments from many users. With this screen M, a user can find when, where and what event will take place.

Figure 2:
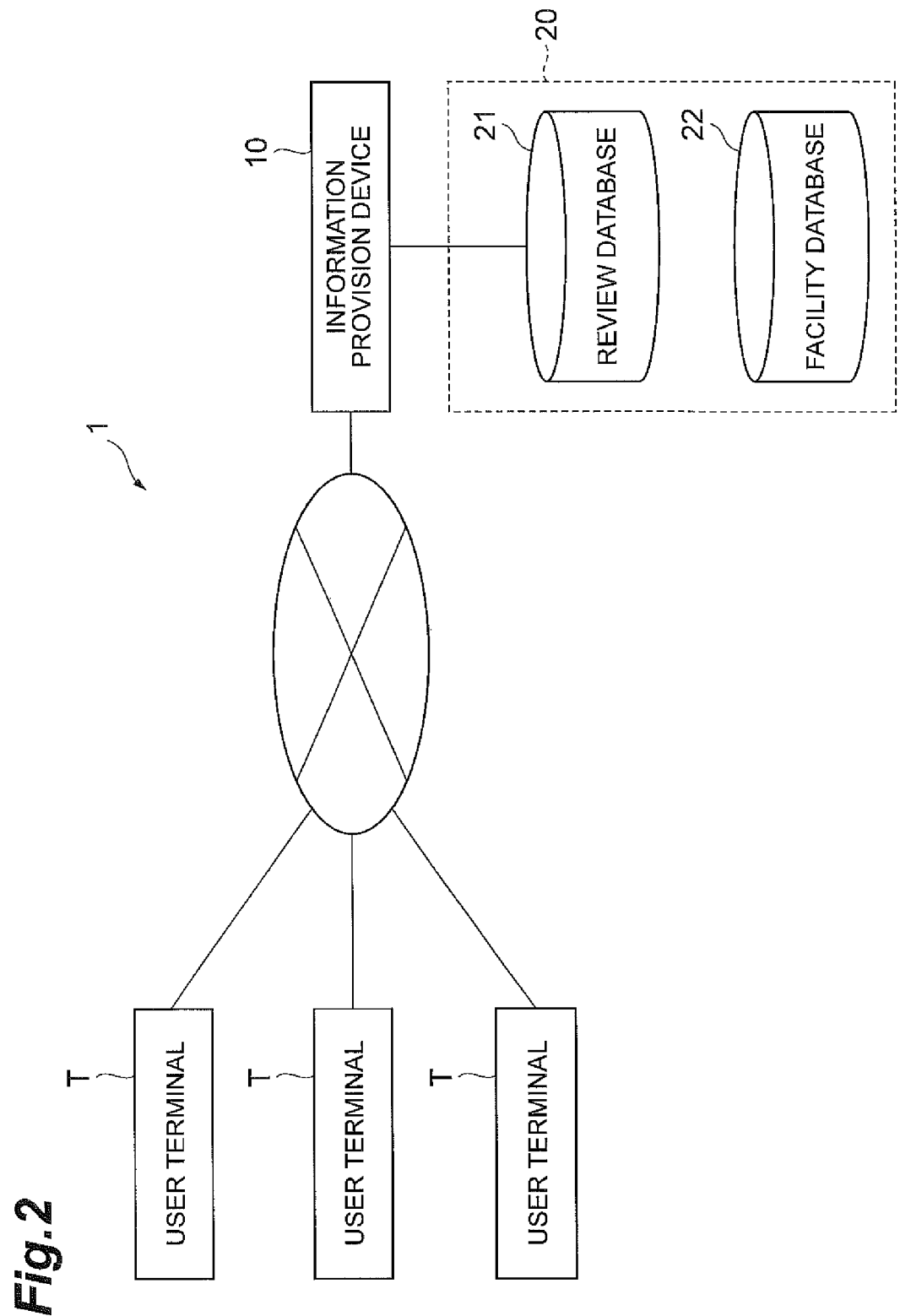
FIG. 2 is a view showing an overall configuration of the information provision system according to the embodiment.

As shown in FIG. 2, the information provision system 1 includes user terminals T, an information provision device 10, and databases (storage units) 20. The user terminals T and the information provision device 10 are connected through a network such as the Internet. The information provision device 10 can access the databases 20 through a network such as the Internet or a private line. Although three user terminals T are shown in FIG. 2, the number of user terminals T is not particularly limited.

The user terminals T are computers that are owned by users. The variety of the user terminals T is not particularly limited, and it may be a stationary or portable personal computer, or a mobile terminal such as an advanced mobile phone (smart phone), a cellular phone or a personal digital assistant (PDA), for example.

The databases 20 are a group of various kinds of databases that are required in the information provision system 1. Each of the databases may be placed in any place, and the databases may be located together in one place or located in different places, for example. The administrator of each database may be the same or different.

The review database 21 is a device that stores comments posted via the Internet by users of facilities. Examples of facilities include accommodation facilities, commercial facilities, public facilities, leisure facilities and the like, though the variety of facilities is not particularly limited.

The posted comments are stored in the review database 21 as review information. For example, when a user enters impressions of a hotel where he/she has stayed and presses a Send button on an accommodation reservation site, the user terminal T transmits the input data to a specified server, and the server generates review information containing the comment and stores it into the review database 21. Note that, because the present invention is based on the assumption that a certain amount of review information has been accumulated, the procedure to generate and store the review information is not particularly limited as long as the review information is eventually stored in the review database 21.

Although a record of the review information contains the following items in this embodiment, the review information may contain other items. Because a user ID is not used in the process described later, this item can be omitted.

User ID that uniquely specifies a reviewer; Facility ID that uniquely specifies a facility used by a reviewer; Day when a reviewer used a facility (date of use); Comments The facility database 22 is a device that stores information of facilities. Although a record of the facility information contains at least the following items in this embodiment, the facility information may contain other facility attributes such as a telephone number and the URL (Uniform Resource Locator) of a homepage.

Facility ID; Facility name; Facility address

Specific structures of the databases 20 are not particularly limited as long as the location of a facility, the comments posted by a user of the facility and the date of use are associated with one another. The structures of the respective databases and records are not limited to those described above, and the databases may be normalized or made redundant by an arbitrary policy. For example, facility attributes (facility name and location) may be contained in the review information to eliminate the need for the facility database 22.

Figure 3:
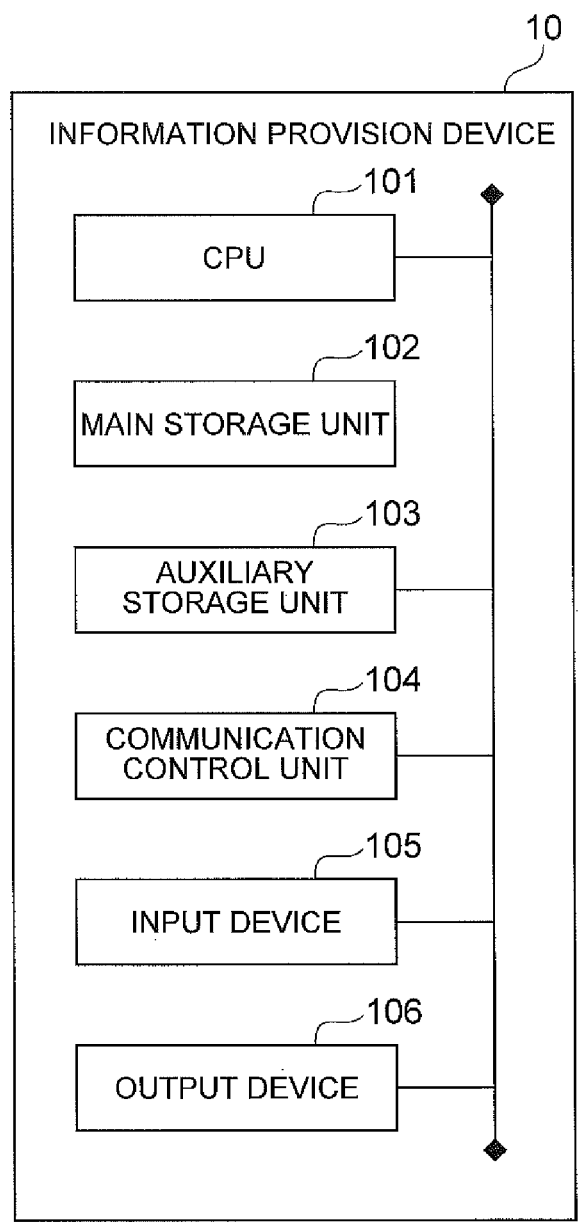
FIG. 3 is a diagram showing a hardware configuration of an information provision device according to the embodiment.

The information provision device 10 is described hereinbelow. FIG. 3 shows a hardware configuration of the information provision device 10. The information provision device 10 includes a CPU 101 that executes an operating system, an application program and the like, a main storage unit 102 such as ROM and RAM, an auxiliary storage unit 103 such as a hard disk or a flash memory, a communication control unit 104 such as a network card or a wireless communication module, an input device 105 such as a keyboard and a mouse, and an output device 106 such as a display.

The functional elements of the information provision device 10, which are described later, are implemented by loading given software onto the CPU 101 or the main storage unit 102, making the communication control unit 104, the input device 105, the output device 106 and the like operate under control of the CPU 101, and performing reading and writing of data in the main storage unit 102 or the auxiliary storage unit 103. The data and databases required for processing are stored in the main storage unit 102 or the auxiliary storage unit 103.

Note that the information provision device 10 may be composed of one computer or may be composed of a plurality of computers.

Figure 4:
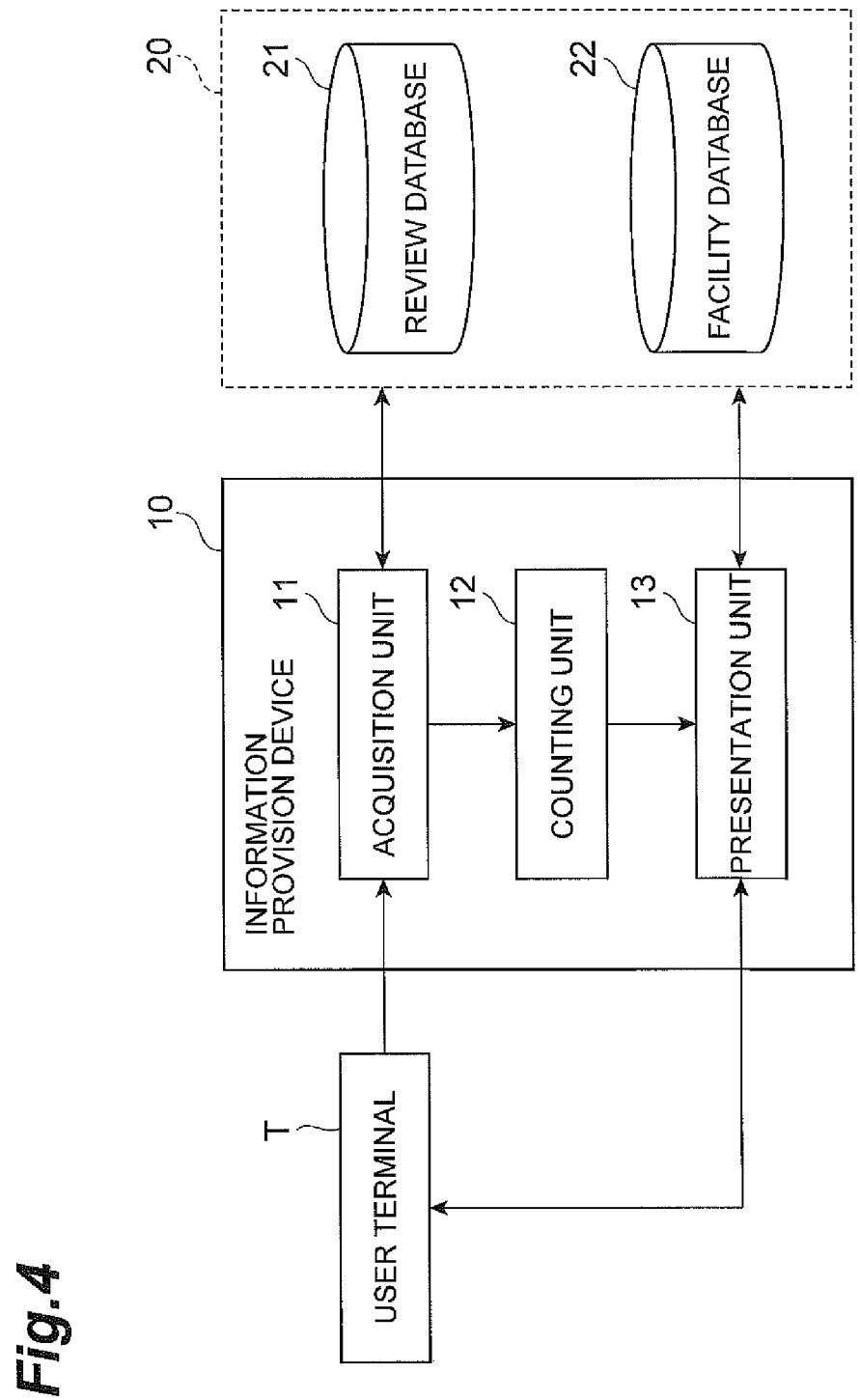
FIG. 4 is a block diagram showing a functional configuration of the information provision device according to the embodiment.

As shown in FIG. 4, the information provision device 10 includes, as functional elements, an acquisition unit 11, a counting unit 12, and a presentation unit 13.

The acquisition unit 11 is a functional element that acquires a set of an area where a facility is located, a keyword contained in a comment by a user of the facility, and the time corresponding to the date of use of the facility by the user (which is referred to hereinafter simply as "set") by referring to the review database 21 and the facility database 22. The acquisition unit 11 performs the following processing upon receiving from the user terminal T a signal that requests the screen as shown in FIG. 1.

First, the acquisition unit 11 reads the records of review information required for the processing from the review database 21. The acquisition unit 11 may read all records or may read only the records that match the search criteria. For example, the acquisition unit 11 may read only the records where the date of use is within a specified period in the past (within the last one year, the last two years, the last half year etc.). Alternatively, the acquisition unit 11 may read only the records related to facilities located in a specific area (in Japan, in Tohoku region etc.). Alternatively, the acquisition unit 11 may read only the records that match the search criteria of both the period and the area. The criteria for extracting the records may be specified by a user, and in this case, the acquisition unit 11 may receive the criteria from the user terminal T.

Then, the acquisition unit 11 creates a set from the respective records of the review information. Processing of creating a set from one record is described hereinafter.

First, the acquisition unit 11 reads the address of a facility by referring to the facility database 22, and specifies the area corresponding to the address. The acquisition unit 11 has the correspondence table between addresses and areas in advance. The acquisition unit 11 converts the address of a facility into the area by using the correspondence table and determines the area item of the set. For example, if the location of a facility is " . . . , Kofu City, Yamanashi Prefecture", and each prefecture is previously defined as one area, the acquisition unit 11 determines that the area item is "Yamanashi Prefecture".

The area that is prepared as one item of the set is a geographical range with a certain size. For example, one area can correspond to one local region, one prefecture, one city, town, or village and the like. Note that the size of the area is not limited thereto, and the area may be set with a certain standard. For example, each area may be defined so that the number of facilities in an area is equal to or more than a specified value (for example, more than ten). Particularly, in the case where the screen of FIG. 1 has a facility search function, which is described later, by defining the area in consideration of the number of facilities, it is possible to enhance the facility searchability and perspicuity.

Further, the acquisition unit 11 specifies the time corresponding to the date of use. The time that is prepared as one item of the set is a time range with a certain length. For example, one time can correspond to one month (or one month in a specific year), one week (or one week in a specific year), one day (one day in a specific year) and the like, though the way to set the time is not limited thereto. For example, if the date of use is "Aug. 5, 2012", and one month is previously defined as one time, the acquisition unit 11 determines that the time is "August". If one time is defined by year and month, the time corresponding to the date of use is "August, 2012".

Then, the acquisition unit 11 extracts a keyword from a comment by morphological analysis. In this embodiment, it is assumed that the acquisition unit 11 acquires a noun ("fireworks", "autumn leaves" etc.) or a noun phrase ("magnificent fireworks", "beautiful autumn leaves") as the keyword. Note that, however, because the keyword may be any word or phrase that can be used as information to help deciding a plan for action, the part of speech of a word to be extracted as the keyword is not limited as long as it satisfies such requirements. For example, if a comment is "We enjoyed grape picking in a farm on the way to our hotel", the acquisition unit 11 acquires the nouns "hotel", "farm" and "grape picking" from this comment. Alternatively, the acquisition unit 11 may acquire "farm on the way to our hotel" as a noun phrase. In this manner, the keyword to be extracted from a comment is not limited to one, and several keywords may be extracted. On the other hand, if a comment is "We enjoyed very much", because there is no noun or noun phrase, the acquisition unit 11 does not extract any keywords from this comment in this embodiment.

After that, the acquisition unit 11 creates the same number of sets as the number of acquired keywords. For example, it is assumed that the area "Yamanashi Prefecture" and the time "August" are specified, and the three keywords "hotel", "farm" and "grape picking" are acquired. In this case, the acquisition unit 11 creates three sets {Yamanashi Prefecture, August, hotel}, {Yamanashi Prefecture, August, farm} and {Yamanashi Prefecture, August, grape picking}. Note that one set is represented as {area, time, keyword}. When the same keyword appears a plurality of times in one comment, the acquisition unit 11 creates only one set for the keyword.

After creating the sets, the acquisition unit 11 proceeds to process the next record. When no keyword is extracted, the acquisition unit 11 proceeds to process the next record without creating any set. When the processing is done for all the read records, the acquisition unit 11 outputs all of the created sets to the counting unit 12.

There may be only a few sets in some area, and the accuracy of determination of the presence or absence of a burst time, which is described later, can be low in such areas. Thus, the acquisition unit 11 may count the number of sets for each area, and when there is an area where the counted value is less than a specified value (for example, less than 100), that area may be merged with an adjacent area into one area. In this case, the acquisition unit 11 rewrites the area items of all the sets corresponding to the area to be merged with the data indicating the area after the merge. In this manner, by reorganizing the areas so that the number of sets in all areas is equal to or more than a specified value, it is possible to keep the number of samples in each area to be a certain value or more and increase the accuracy of determination of a burst time.

The counting unit 12 is a functional element that calculates the distribution of the number of sets for each pair of an area and a keyword. Note that the number of sets of each pair is, in other words, the number of reviews corresponding to the combination of an area and a keyword.

First, the counting unit 12 sorts the input sets into groups of each pair of an area and a keyword. For example, when the counting unit 12 processes a pair of the area "Yamanashi Prefecture" and the keyword "hotel", one or more sets of {Yamanashi Prefecture, January, hotel}, one or more sets of {Yamanashi Prefecture, February, hotel} and the like are sorted into one group of the pair {Yamanashi Prefecture, hotel}". Note that one pair is represented as {area, keyword}.

Next, the counting unit 12 counts the number of sets in each time during a specified period for each pair and thereby obtains the distribution of the number of sets in the period. The way to set a specified period and each time is not limited. For example, a specified period may be one year, and each month may be each time, or a specified period may be one week, and each day of the week may be each time.

Figure 5:
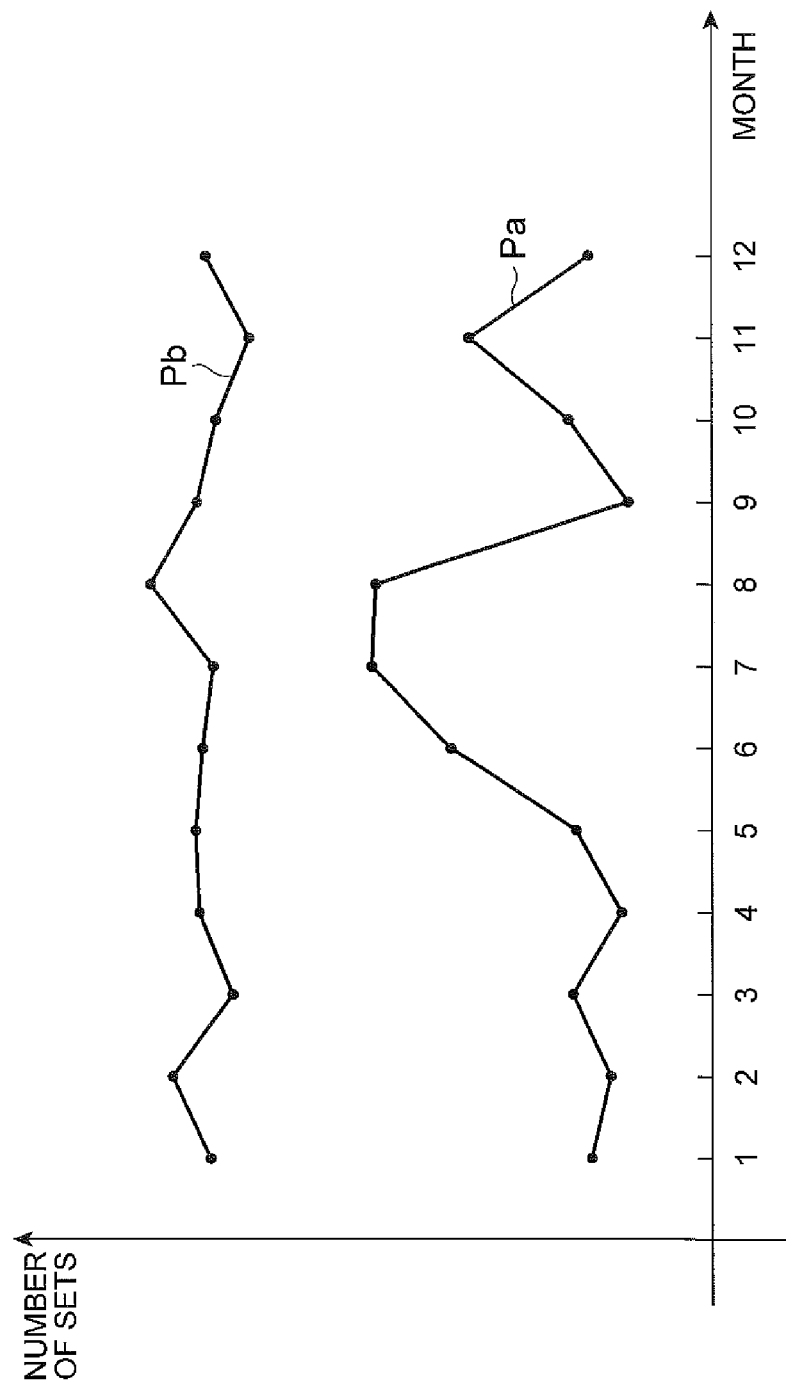
FIG. 5 is a graph illustrating a concept of a burst time.
Figure 6:
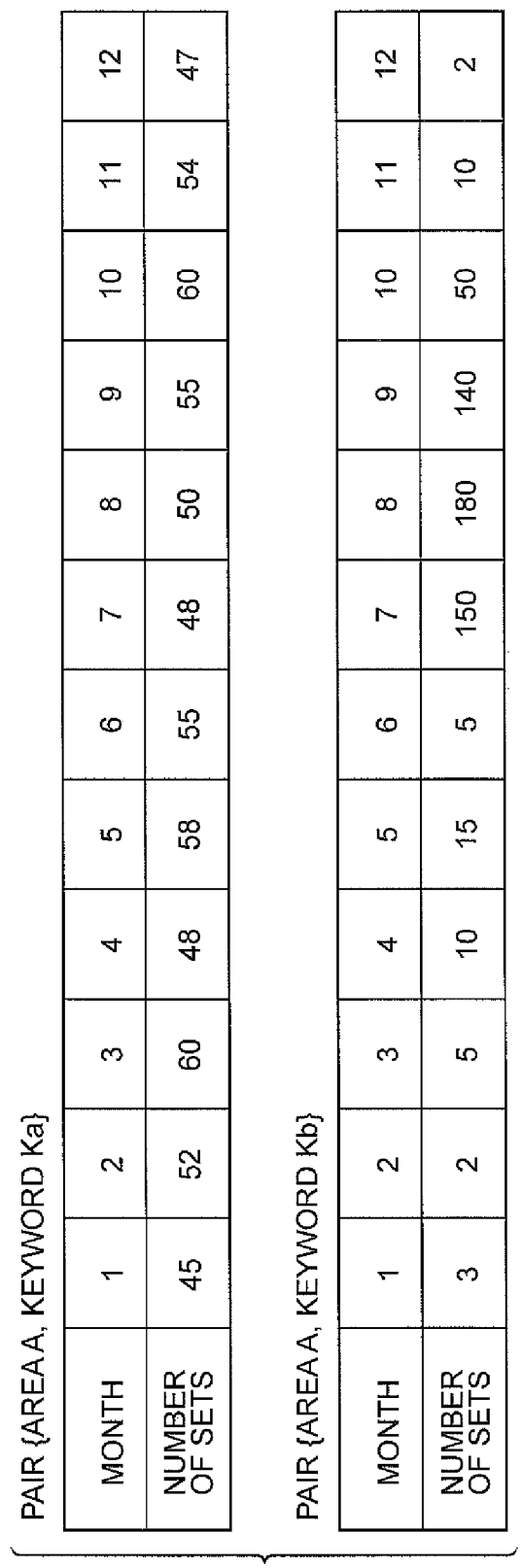
FIG. 6 is a view showing an example of distribution of the number of sets for a pair of an area and a keyword.

FIGS. 5 and 6 show an example of the distribution of the number of sets. FIG. 5 is a graph showing the distribution of the number of sets that is counted on a month-by-month basis in one year for each of pairs Pa and Pb. FIG. 6 shows the distribution for two pairs {area A, keyword Ka} and {area A, keyword Kb} in a table, where a specified period is one year and each month is one time.

The counting unit 12 outputs data indicating the distribution of the number of sets for each pair to the presentation unit 13.

The presentation unit 13 is a functional element that outputs information about a pair of an area and a keyword having a burst time, in association with the burst time.

First, the presentation unit 13 determines the presence or absence of a burst time for each pair. The "burst time" in this specification is the time when the number of sets is larger than that in the other periods by a specified criterion (which is also referred to hereinafter as "burst criterion") or more. The burst time is, in other words, the time when the frequency of appearance of a specific keyword in a specific area is outstandingly high.

The concept of the burst time is described with reference to FIG. 5. For the pair Pa, the number of sets is outstanding in July and August, and those two times are set as the burst time. Further, for this pair Pa, the number of sets is also large in June and November, and there is a possibility that those times are also set as the burst time. On the other hand, for the pair Pb, the number of sets does not vary largely throughout the year, and it is determined that there is no burst time.

The presentation unit 13 determines whether each time for one pair corresponds to the burst time. Specifically, the presentation unit 13 compares the number of sets Nx in a time Tx to be determined with the statistics Na of the number of sets in the other n number of times T1, T2, . . . , Tn. Then, the presentation unit 13 determines that the time Tx is the burst time when the number of sets Nx is larger than the statistics Na by a specified criterion or more, and otherwise determines that the time Tx is not the burst time. The burst criterion can be represented by an arbitrary multiple or percentage (for example, five times, ten times, 150% etc.). An example of the statistics is an average value, a median value or the like, though the statistics is not limited thereto.

Application of such a determination process to the example of FIG. 6 is as follows. It is assumed that there are two types of burst criteria: five times and ten times.

First, the case of the pair {area A, keyword Ka} is described. The number of sets in January is 45, and the average of the number of sets in the other months (February to December) is (52+60+ . . . +47)/11≈53.4. Further, the median of the number of sets in the other months is 54. When any of the average and the median is used as the statistics, the number of sets in January is neither five times nor ten times the statistics, and therefore the presentation unit 13 determines that January is not the burst time.

As for February, the number of sets in this month is 52, and the average of the number of sets in the other months (January and Match to December) is (45+60+48+ . . . +47)≈52.7. Further, the median of the number of sets in the other months is 54. When any of the average and the median is used as the statistics, the number of sets in February is neither five times nor ten times the statistics, and therefore the presentation unit 13 determines that February is also not the burst time.

For the pair {area A, keyword Ka}, none of the Match to December is the burst time. Therefore, the presentation unit 13 determines that there is no burst time for the pair {area A, keyword Ka}.

Next, the case of the pair {area A, keyword Kb} is described, and description is given only for July and August when the number of sets is relatively large.

The number of sets in July is 150, and the average of the number of sets in the other months is about 38.4. Further, the median of the number of sets in the other months is 10. Thus, when the average is used, the number of sets in July is neither five times nor ten times the average value, and therefore the presentation unit 13 determines that July is not the burst time. On the other hand, when the median is used, the number of sets in July is both five times and ten times the median value, and therefore the presentation unit 13 determines that July is the burst time when the burst criterion is any of those.

The number of sets in August is 180, and the average of the number of sets in the other months is 35.6. Further, the median of the number of sets in the other months is 10. Thus, when the average is used, the presentation unit 13 determines that July is the burst time only when the burst criterion is set to five times. On the other hand, when the median is used, the presentation unit 13 determines that July is the burst time when the burst criterion is any of the five times and ten times.

Therefore, the presentation unit 13 determines that there is a burst time for the pair {area A, keyword Kb}. Note that, however, which month is the burst time varies depending on the statistics and the burst criterion used.

The presentation unit 13 performs the determination about the burst time for all pairs. The presentation unit 13 then sets the burst time only for the pair with the burst time, and discards the information of the pair without the burst time. Note that, in this specification, a keyword having the burst time in a certain area is also referred to as "burst word".

After that, the presentation unit 13 creates a web page as for example shown in FIG. 1 by using the data of the pair having the burst time, and transmits the web page as a response signal to the user terminal T. The user terminal T displays the web page, and the user can thereby find when, where and what event will take place.

The functions of the web page are described hereinafter with reference back to FIG. 1. When one time is selected on the time axis J by a user operation, a program (which is referred to hereinafter as "display control program") of the web page displays information of the pair whose burst times corresponds to the selected period. To be specific, as shown in FIG. 1, the display control program draws a speech balloon at the position corresponding to the area item of the pair and puts a keyword (burst word) inside the speech balloon. Note that the way to represent the correspondence between the area and the keyword is not limited to the speech balloon, and any other figures or visual effects may be used.

The burst time and the area can be common among a plurality of keywords. In this case, the display control program may display those keywords all together in one speech balloon, so that only one keyword is shown for a plurality of areas. Alternatively, the display control program may display each speech balloon so that the speech balloons of the respective keywords do not overlap.

In the case where the same burst word exists in the same time in a plurality of adjacent areas, information of the burst word for the plurality of areas may be displayed in an integrated manner. For example, the display control program may display only one speech balloon for those areas. In this case, the burst word is easy to be viewed.

The display control program sets the slider L on the time axis. A user can change the time by moving the slider L. After this operation, the display control program deletes information of the pair displayed until then and displays information of the pair whose burst time corresponds to the time after change. Note that a user interface for changing the time is not limited to the slider, and it may be another GUI (Graphical User Interface) such as a text box or a radio button.

The display control program may have a function of changing the scale of the time axis J at a plurality of levels. For example, when one month is selected on the time axis J with the length of one year, the display control program changes the length of the time axis J into one month and sets the slider L to move on a week-by-week basis. Further, when one week is selected on the time axis J, the display control program changes the length of the time axis J into one week and sets the slider L to move on a day-by-day basis (on a day of the week basis). As a matter of course, the display control program can change the length of the time axis J back from one week to one month and to one year. When switching the scale of the time axis J, the display control program transmits to the information provision device 10 a period for which the review information needs to be acquired, as search criteria. Then, in the information provision device 10, the acquisition unit 11 acquires the sets that meets the criteria, the counting unit 12 performs the above-described processing based on the sets, and the presentation unit 13 transmits to the user terminal T data required for the screen display after change.

By clicking on a speech balloon (by selecting a keyword), a user can display information of the facilities located in the area corresponding to the speech balloon (keyword) on the screen. The display control program transmits to the information provision device 10 the area corresponding to the speech balloon clicked on, as search criteria. When one speech balloon corresponds to a plurality of areas, the search criteria contain information about the plurality of areas. In this case, the presentation unit 13 reads the facility information corresponding to that area from the facility database 22, and transmits the facility information as a response signal to the user terminal T. The display control program receives the facility information and displays a list of facilities on the screen M or on another window.

The display control program may transmit to the information provision device 10 the area corresponding to the speech balloon and the time specified on the time axis, as search criteria. In this case, the presentation unit 13 reads from the facility database 22 information of facilities that are located in the area and available in the specified time (for example, information of accommodation plans available in the specified time), and transmits the facility information as a response signal to the user terminal T.

Figure 7:
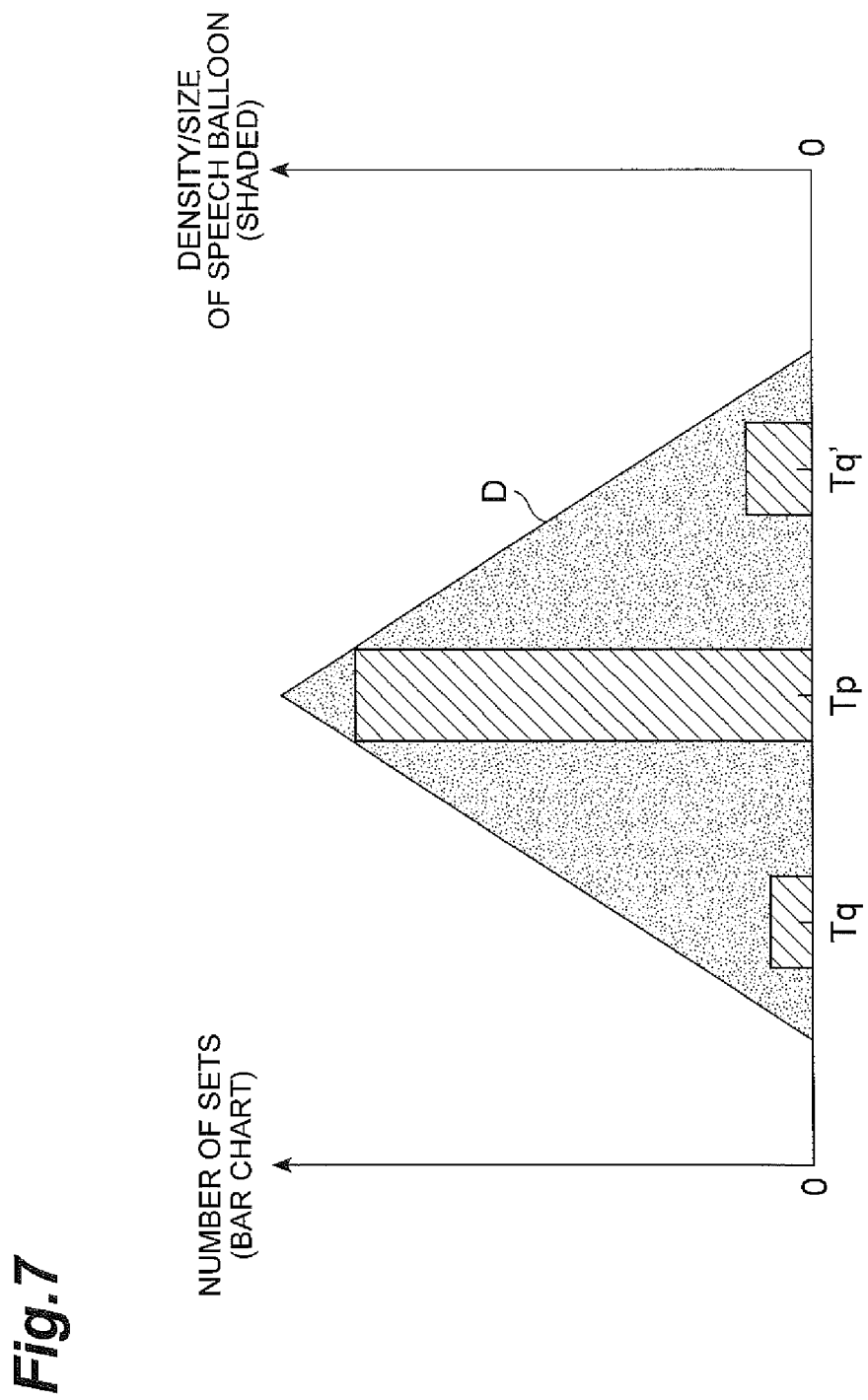
FIG. 7 is a view showing a concept of a way to display a speech balloon.

In the case a certain speech balloon is displayed in one time but not displayed in the adjacent time (in other words, when, for a pair of the area and the keyword corresponding to the speech balloon, a certain time is the burst time and the adjacent time is not the burst time), the display control program may display the speech balloon (keyword) in the adjacent time also. Note that, however, the density (or size) of the display of the speech balloon (keyword) in the adjacent time is lower (or smaller) than that in the burst time. FIG. 7 shows the concept of such display control. This figure shows that the density or size of the speech balloon indicated by the shading is the maximum (specified emphasis) in the burst time Tp, and in the adjacent times Tq and Tq' with a smaller number of sets, the speech balloon is lighter or smaller than that in the burst time Tp.

In this manner, by displaying the keyword in the burst time with an emphasis and displaying the keyword in the adjacent times to the burst time with less emphasis than in the burst time, it is possible to let a user who moves the slider find the presence of the burst word. Although a user can fail to find the burst word when display is made only in a moment of the burst time, by making the speech balloon fade in or out in this manner, a user can easily find the presence of the burst word. Further, because the keyword is displayed most densely when the slider L is at the burst time, it is possible to let a user know the timing when the burst word is just in season.

It should be noted that the presentation unit 13 transmits the web page to the user terminal T in this embodiment, a specific technique for creating a screen is not limited. The presentation unit 13 may create a screen using a given script or program language and transmit data of the screen to the user terminal T.

Figure 8:
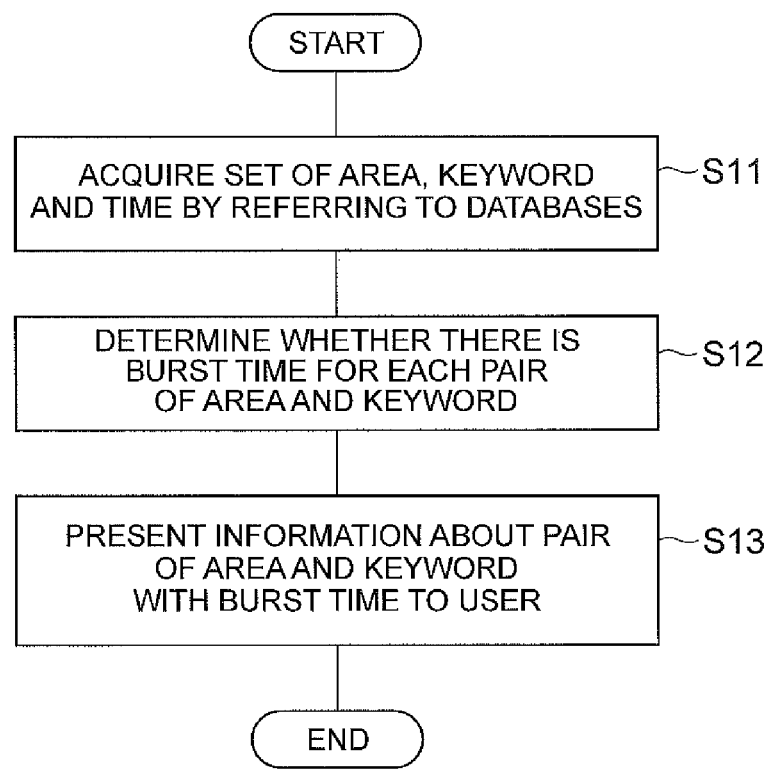
FIG. 8 is a flowchart showing an operation of the information provision device according to the embodiment.

The operation of the information provision device 10 is described, and further an information provision method according to this embodiment is described hereinafter with reference to FIG. 8.

First, the acquisition unit 11 acquires sets of areas, keywords and times by referring to the review database 21 and the facility database 22 (Step S11, acquisition step). In this processing, the acquisition unit 11 extracts a keyword by morphological analysis of comments, specifies an area from the facility information and specifies a time from the date of use.

Then, the counting unit 12 obtains the distribution of the number of sets in a specified period for each pair of an area and a keyword (counting step).

Then, the presentation unit 13 determines whether there is a burst time (Step S12). When the number of sets in a time to be determined is larger than the statistics of the number of sets in the other times by a specified criterion or more, the presentation unit 13 determines that the time to be determined is the burst time, and otherwise determines that the time to be determined is not the burst time. The presentation unit 13 performs this processing for each pair.

Then, the presentation unit 13 presents information about pairs of areas and keywords with the burst time to the user (Step S13, presentation step). In this processing, the presentation unit 13 transmits the screen (for example, web page) as shown in FIG. 1 to the user terminal T, and the user terminal T displays the screen. This screen displays the pairs of areas and keywords in association with the burst time, and the screen further has the various functions described above. Thus, the user can find when, where and what event will take place and can further check information of facilities located in the area where the event will be held.

Figure 9:
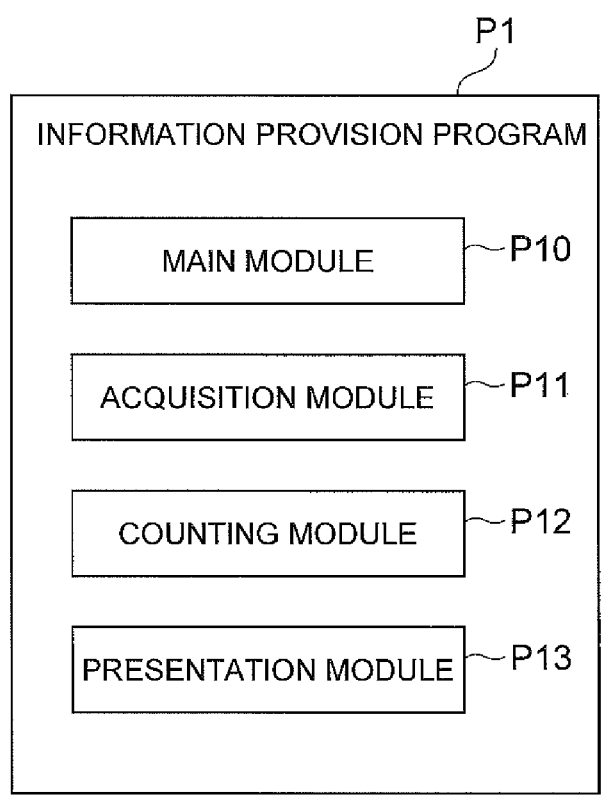
FIG. 9 is a view showing a configuration of an information provision program according to the embodiment.

An information provision program P1 for implementing the information provision device 10 is described hereinafter with reference to FIG. 9.

The information provision program P1 includes a main module P10, an acquisition module P11, a counting module P12, and a presentation module P13.

The main module P10 is a part that exercises control over the information provision function. The functions implemented by executing the acquisition module P11, the counting module P12 and the presentation module P13 are equal to the functions of the acquisition unit 11, the counting unit 12 and the presentation unit 13 described above, respectively.

The information provision program P1 may be provided in the form of being recorded in a static manner on a tangible recording medium such as CD-ROM or DVD-ROM or semiconductor memory, for example. Further, the information provision program P1 may be provided as a data signal superimposed onto a carrier wave through a communication network.

As described above, according to this embodiment, data containing areas where facilities are located, keywords extracted from posted comments, and times when facilities are used is summarized, and pairs of areas and keywords are presented where there is a time (burst time) when the number of sets (the number of appearances) is outstandingly larger than in the other times. The presented keywords indicate the events that attract attention in a specific time in a specific place. In this manner, by presenting when, where and what event will take place based on the posted comments with less bias, it is possible to provide a user with information to help deciding a plan for action easily with less bias.

Use of many posted comments allows reduction of bias of information. However, merely summarizing the comments (for example, merely counting the number of appearances of a keyword) can cause selection of keywords (for example, "hot spring", "mountain" etc.) that appear uniformly in the respective times. Because such keywords are not characteristic, it is not possible to appeal "when" to take action to a user. To solve such a technical problem in keyword extraction, it is determined in this embodiment whether a keyword appears frequently in a specific time or not to extract a characteristic keyword. In order to perform this determination easily and accurately, the number of sets in one time is compared with the statistics (average, median etc.) in the other times in this embodiment.

Because information about a burst word is displayed using a map, a speech balloon, a time axis and a slider in the above-described embodiment, a user can easily grasp the information.

In the above-described embodiment, when a user clicks on a speech balloon, facility information in the corresponding area is displayed. By presenting not only a burst word but also facility information, it is possible to not only give a user the motivation for action but also further encourage the action.

An embodiment of the present invention is described in detail above. However, the present invention is not limited to the above-described embodiment. Various changes and modifications may be made to the present invention without departing from the scope of the invention.

Although the information provision device 10 provides the screen as shown in FIG. 1 to a user in the above-described embodiment, information about the pairs of areas and keywords with the burst time may be output in a different way. For example, the information provision device 10 may output information about the pairs with the burst time simply by text.

Although the burst words are shown to be visually easily understandable as in FIG. 1 in the above-described embodiment, the presentation unit may output information about the burst words simply by text.

Although facility information is displayed by clicking on a speech balloon in the above-described embodiment, this feature may be omitted.

REFERENCE SIGNS LIST

1 . . . information provision system, 10 . . . information provision device, 11 . . . acquisition unit, 12 . . . counting unit, 13 . . . presentation unit, 20 . . . databases, 21 . . . review database, 22 . . . facility database, P1 . . . information provision program, P10 . . . main module, P11 . . . acquisition module, P12 . . . counting module, P13 . . . presentation module

The invention claimed is:
1. An information provision device comprising:
at least one memory operable to store computer program code; and
at least one hardware processor operable to read said program code and operate according to said program code, said program code including:
acquisition code configured to cause at least one of said at least one hardware processor to acquire data sets corresponding to at least one facility that is used during a range of time periods, each data set comprising:
a geographical area where the at least one facility is located;
a keyword extracted from a user comment; and
a time period in which the at least one facility is used;
counting code configured to cause at least one of said at least one hardware processor to count the number of data sets corresponding to each time period which include the geographical area and the keyword, and thereby obtain a distribution of the number of data sets over the range of time periods; and
presentation code configured to cause at least one of said at least one hardware processor to output information that includes a pair of the geographical area and the keyword on a user interface based, at least in part, on a user selected time period, in response to the user selected time period corresponding to a burst time, wherein
when, the number of data sets in the geographical area is less than a specified value, and an accuracy of determination of a presence of the burst time is lower than a predetermined amount, the acquisition code is further configured to reorganize the geographical area such that the number of data sets is greater than or equal the specified value and the accuracy of determination is greater than or equal the predetermined amount.

2. The information provision device according to claim 1, wherein
when the number of data sets in one time period is larger than statistics of the number of data sets in a plurality of other time periods by the specified value or more, the presentation code causes at least one of said at least one hardware processor to determine that the one time period exists as the burst time.

3. The information provision device according to claim 1, wherein
the reorganizing includes merging the geographical area and an adjacent geographical area.

4. The information provision device according to claim 1, wherein
the presentation code is further configured to cause at least one of said at least one hardware processor to output information about the pair by a map indicating the geographical area of the pair having the burst time, the keyword displayed corresponding to the geographical area, and another user interface for changing the time.

5. The information provision device according to claim 4, wherein
the keyword is displayed with a specified emphasis in the burst time, and displayed with a less emphasis than the specified emphasis in times adjacent to the burst time.

6. The information provision device according to claim 4, wherein when displaying same keywords in the same burst time in a plurality of adjacent geographical areas, one of the same keywords is displayed corresponding to the plurality of geographical areas.

7. The information provision device according to claim 4, wherein when the keyword is selected, information of facilities located in the geographical area corresponding to the keyword is displayed.

8. The information provision device according to claim 7, wherein
each geographical area is set to include at least a specified number of facilities.

9. The information provision device according to claim 1, wherein
the presentation code is configured to cause at least one of said at least one hardware processor to:
compare a first number of data sets associated with a first time period with the other numbers of data sets associated with other time periods of the range of time periods;
identify the first time period as the burst time when the first number of data sets is larger than the other numbers of data sets by the specific value; and
output the information in response to the user selected time period corresponding to the burst time.

10. The information provision device according to claim 9, wherein
the presentation code is further configured to cause at least one of said at least one hardware processor to discard the data sets in response to the first number of data sets is not larger than the other number of data sets by the specified value.

11. An information provision method performed by at least one processor in an information provision device, comprising:
acquiring one or more data sets corresponding to at least one facility that is used during a range of time periods, each data set comprising:
a geographical area where the at least one facility is located;
a keyword extracted from a user comment; and
a time period in which the at least one facility is used;
counting a number of data sets corresponding to each time period which include the geographical area and the keyword, and thereby obtaining a distribution of the number of data sets over the range of time periods; and
outputting information that includes a pair of the geographical area and the keyword on a user interface based, at least in part, on a user selected time period, in response to the user selected time period corresponding to a burst time, wherein
when, the number of data sets in the geographical area is less than a specified value, and an accuracy of determination of a presence of the burst time is lower than a predetermined amount, reorganizing the geographical area such that the number of data sets is greater than or equal the specified value and the accuracy of determination is greater than or equal the predetermined amount.

12. A non-transitory computer-readable recording medium storing an information provision program causing a computer to:
acquire one or more data sets corresponding to at least one facility that is used during a range of time periods, each data set comprising:
a geographical area where the at least one facility is located;
a keyword extracted from a user comment; and
a time period in which the at least one facility is used;
count a number of data sets corresponding to each time period which include the geographical area and the keyword, and thereby obtain a distribution of the number of data sets over the range of time periods; and
output information that includes a pair of the geographical area and the keyword on a user interface based, at least in part, on a user selected time period, in response to the user selected time period corresponding to a burst time, wherein
when, the number of data sets in the geographical area is less than a specified value, and an accuracy of determination of a presence of the burst time is lower than a predetermined amount, the computer reorganizes the geographical area such that the number of data sets is greater than or equal the specified value and the accuracy of determination is greater than or equal the predetermined amount.

* * * * *